United States Patent
Suh et al.

(10) Patent No.: US 7,609,591 B2
(45) Date of Patent: Oct. 27, 2009

(54) HEAT-ASSISTED MAGNETIC RECORDING HEAD

(75) Inventors: Sung-dong Suh, Seoul (KR); Young-hun Im, Suwon-si (KR); Hae-sung Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 594 days.

(21) Appl. No.: 11/508,996

(22) Filed: Aug. 24, 2006

(65) Prior Publication Data
US 2007/0153417 A1 Jul. 5, 2007

(30) Foreign Application Priority Data
Jan. 4, 2006 (KR) .................. 10-2006-0000889

(51) Int. Cl.
*G11B 11/00* (2006.01)
*G11B 5/127* (2006.01)

(52) U.S. Cl. ............ 369/13.33; 369/13.17; 360/125.03; 360/59

(58) Field of Classification Search .............. 369/13.32, 369/13.33, 13.17, 13.18, 112.01, 112.29, 369/44.14; 360/125.03, 125.01, 125.02, 360/59
See application file for complete search history.

(56) References Cited

U.S. PATENT DOCUMENTS
2007/0159718 A1* 7/2007 Kim et al. .................. 360/125

FOREIGN PATENT DOCUMENTS

| CN | 1332444 A | 1/2002 |
|----|-----------|--------|
| CN | 1627371 A | 6/2002 |
| CN | 1378687 A | 11/2002 |
| CN | 1404041 A | 3/2003 |
| CN | 1448916 A | 10/2003 |

* cited by examiner

*Primary Examiner*—Ali Neyzari
(74) *Attorney, Agent, or Firm*—Sughrue Mion, PLLC

(57) ABSTRACT

A heat-assisted magnetic recording head mounted on an end of a slider having an Air Bearing Surface ("ABS") for recording data on a recording medium. The heat-assisted magnetic recording head includes a magnetic path forming unit that generates a magnetic field for recording the data, a light source that emits light heating a local region of the recording medium, a waveguide located on a side of the magnet path forming unit to transmit the light emitted from the light source, an optical path conversion unit that changes a direction of the light transmitted from the waveguide to the local region of the recording medium, and a nano-aperture that generates an enhanced near-field effect by converting an energy distribution of the light transmitted via the optical path conversion unit.

15 Claims, 5 Drawing Sheets

HEAT-ASSISTED MAGNETIC RECORDING HEAD

CROSS-REFERENCE TO RELATED PATENT APPLICATION

This application claims priority from Korean Patent Application No. 10-2006-0000889, filed on Jan. 4, 2006, in the Korean Intellectual Property Office, the disclosure of which is incorporated herein in its entirety by reference.

BACKGROUND OF THE INVENTION

1. Field of the Invention

An apparatus consistent with the present invention relates to a heat-assisted magnetic recording ("HAMR") head configured for high-density recording and, more particularly, to a HAMR head that can be fabricated in a monolithic body and realize an enhanced near-field effect.

2. Description of the Related Art

Many studies have been performed in the area of magnetic recording for increasing the magnetic recording density. In the case of longitudinal magnetic recording, a recording density of 100 Gbit/in$^2$ is achieved, and in the case of perpendicular magnetic recording, a recording density more than 100 Gbit/in$^2$ is possible. However, since there is thermal instability in the magnetic recording technology due to the super paramagnetic effect, an increase in the recording density is limited.

The thermal stability of a recording medium is determined by the ratio of magnetic anisotropy energy to thermal energy. In order to increase the magnetic anisotropy energy, the magnetic recording medium must be formed of a material having a high coercive force. When this material is used for magnetic recording, an electric field having an intensity as high as the coercive force should be used. However, since the magnetic field at the tip portion of the recording head is saturated at a predetermined level, the intensity of the magnetic field generated in the magnetic recording head is limited, thereby causing failure in the recording.

To solve the above problem, a HAMR head has been studied. The HAMR head records data by heating a local portion of the recording medium above the Curie temperature and temporarily reducing the coercive force of the local portion. That is, in order to perform a recording operation, the intensity of the required magnetic field can be lowered.

At this point, since a data-recording region is heated above the Curie temperature, the recording density is determined by the width of the heated portion rather than the size of a pole generating the magnetic field in a gap. For example, when light is selected as the heat-assisting medium, the data recording density is determined by the spot size of the light reaching the recording medium. Accordingly, a study on an optical unit that can reduce the spot size of light and increase the intensity of light is required.

FIG. 1 is a perspective view of an example of a conventional HAMR head. Referring to FIG. 1, HAMR head 22 includes a magnetic recording unit, a light source 52 for heating a recording medium 16, and a light transmission module for transmitting the light from the light source 52 to the recording medium 16.

The magnetic recording unit includes a coil 33, which is a magnetic field source, a recording pole 30 for generating a magnetic field for recording, and a return yoke 32 magnetically connected to the recording pole 30 to form a magnetic path H. The recording pole 30 includes first and second layers 46 and 48.

The optical transmission module includes a waveguide 50 for guiding the light emitted from the light source 52 and an optical fiber 54 connecting the light source 52 to the waveguide 50. Optical energy 58 is transmitted to the magnetic recording medium 16 through a heat discharge surface 56 of the waveguide 50, thereby heating a local portion of the magnetic recording medium 16.

The magnetic recording medium 16 moves relative to the HAMR head 22 in a direction indicated by arrow A. Therefore, the heated local portion is located with respect to the recording pole 30 by the relative motion of the magnetic recording medium 16. As a result, the recording pole 30 effectively records data on the local portion whose coercive force is reduced by heating. In addition, after the recording is finished, the heated local portion is cooled down to have the inherent high coercive force, thereby maintaining thermally-stable recording bits.

In order to record at a high density using the HAMR head, the size of the light spot must be sufficiently small while the recording medium must be sufficiently heated. However, the structure of the conventional HAMR head is designed not to provide a field enhancement effect and the waveguide must be independently fabricated from the magnetic head and precisely aligned therewith.

SUMMARY OF THE INVENTION

The present invention provides a HAMR head that can carry out high density recording by realizing a relatively small light spot size and that can be fabricated monolithically with a conventional magnetic recording head process.

According to an aspect of the present invention, there is provided a HAMR head mounted on an end of a slider having an Air Bearing Surface ("ABS") for recording data on a recording medium, the heat-assisted magnetic recording head including: a magnetic path forming unit forming a magnetic field for recording the data; a light source emitting light for heating a local region of the recording medium; a waveguide located on a side of the magnet path forming unit to transmit the light emitted from the light source; an optical path conversion unit changing the direction of the light transmitted from the waveguide to the local region of the recording medium; and a nano-aperture configured to generate an enhanced near-field effect by converting an energy distribution of the light transmitted via the optical path conversion unit.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF ILLUSTRATIVE, NON-LIMITING EMBODIMENTS OF THE INVENTION

The present invention will now be described more fully with reference to the accompanying drawings, in which exemplary embodiments of the invention are shown.

Figure 1:
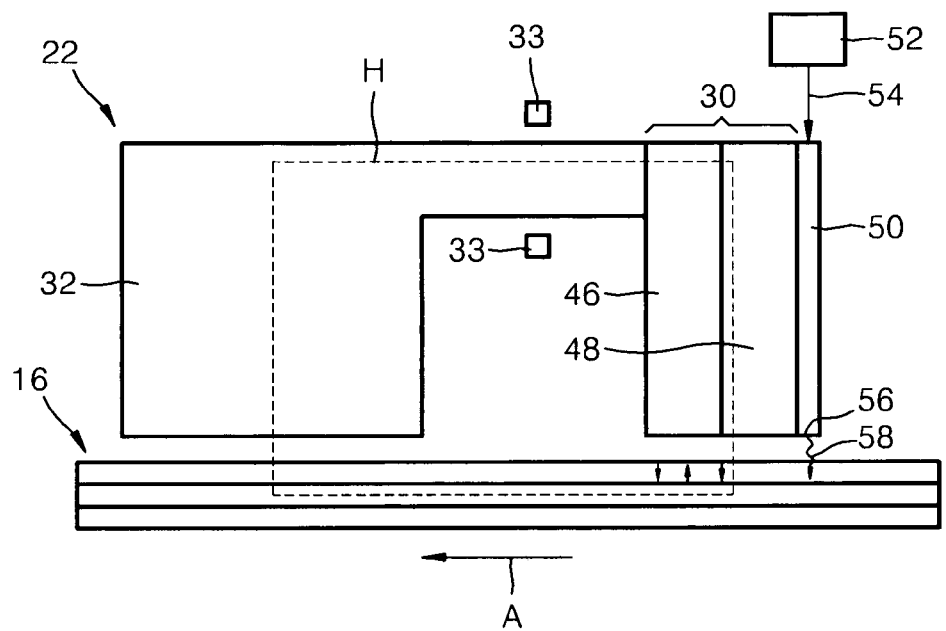
FIG. 1 is a side view of an example of a conventional HAMR head.
Figure 2:
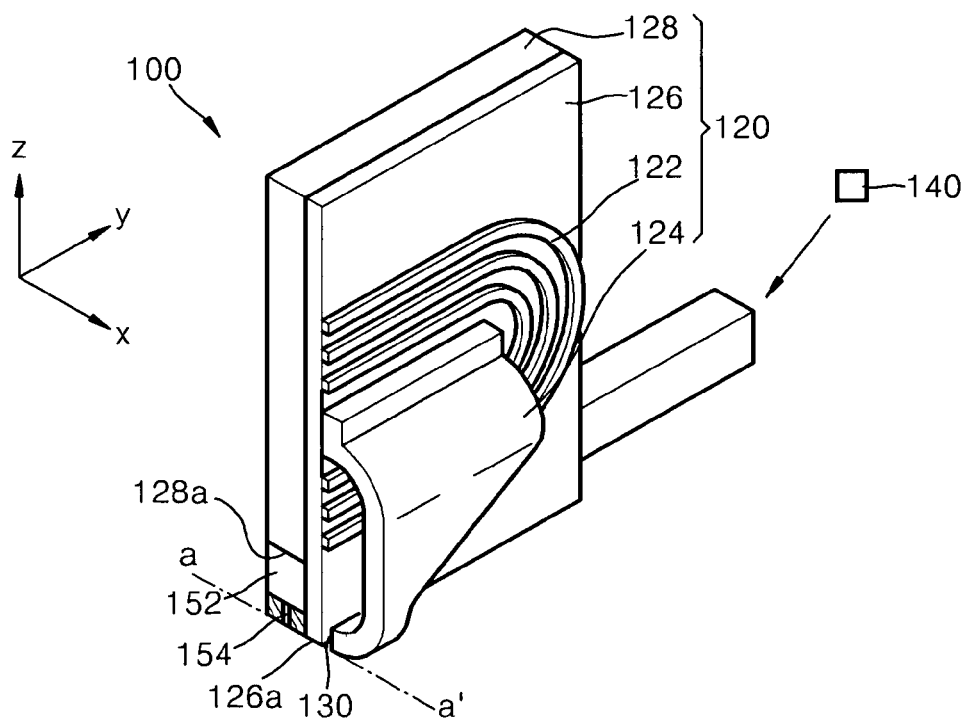
FIG. 2 is a perspective view of a HAMR head according to an embodiment of the present invention.
Figure 3:
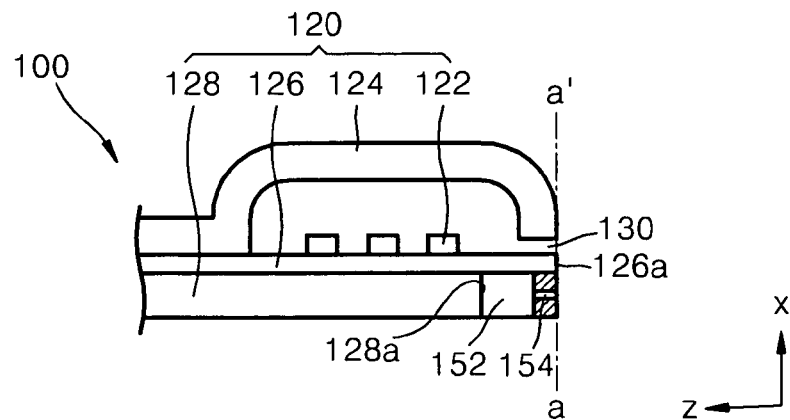
FIG. 3 is a partial view of the HAMR head depicted in FIG. 2.

FIGS. 2 and 3 are respectively perspective and partial views of a HAMR head 100 according to an embodiment of the present invention. Referring to the drawings, the HAMR head 100 includes a magnetic path forming unit 120 for generating a recording magnetic field, a light source 140 for emitting light to heat the recording region of a recording medium, a waveguide 152 for transmitting light emitted from the light source 140, and a nano-aperture 154 for generating an enhanced near-field effect by converting the energy distribution of the light transmitted from the waveguide 152.

The HAMR head 100 has an end portion corresponding to the air bearing surface ("ABS") of a slider (not shown). That is, an x-y plane including line a-a' is the ABS. As a recording medium (not shown) having a recording surface facing the ABS rotates at a high speed, the HAMR head 100 is lifted together with the slider by an air bearing system, thereby maintaining a predetermined flying height relative to the recording medium.

The magnetic path forming unit 120 includes a coil 122, which is a magnetic field source, a return yoke 124 that functions as the magnetic path of the magnetic field formed around the coil 122, and a main pole 126 spaced apart from one end of the return yoke 124 and connected to the other end of the return yoke 124 to form the magnetic path together with the return yoke 124.

The opposing surface of the return yoke to the recording medium is located on the ABS and the surface of the main pole 126 opposite to the recording medium is also located on the ABS.

An air gap 130 is formed between the main pole 126 and the first end of the return yoke 124. Accordingly, the magnetic field in the main pole 126 leaks outward. The recording medium is magnetized by thy leakage flux to perform the recording.

A sub-yoke 128 is formed on the side surface of the main pole 126. The main pole 126 and the sub-yoke 128 have respectively first and second end portions 126a and 128a facing the recording medium. At this point, the main pole 126 and the sub-yoke 128 are arranged such that the first and second end portions 126a and 128a are stepped.

The sub-yoke 128 is spaced apart from the ABS and allows the recording magnetic field to be effectively concentrated on the first end portion 126a of the main pole 126, thereby increasing the intensity of the leakage flux near the gap 130. Since the concentrating effect is limited by the saturation magnetization value of a material forming the magnetic path, the main pole 126 may be formed of a material having a saturation magnetization value greater than that of the sub-yoke.

As the main pole 126 and the sub-yoke 128 are arranged such that the first end portions 126a and 128a are stepped, at least a portion of the waveguide 152 is located in a space between the first and second end portions 126a and 128a.

The waveguide 152 has an end portion facing a predetermined region of the recording medium on which the recording is performed and the nano-aperture 154 is located on the end portion of the waveguide 152. The nano-aperture 154 is a fine aperture surrounded by a metal film.

The light emitted from the light source 140 may be butt-coupled to the waveguide 152. Alternatively, the light emitted from the light source 140 may be coupled to the waveguide 152 by a prism coupler, a grating coupler, or the like.

The waveguide 152 transmits the light in a direction parallel to the ABS. Therefore, in order to allow the transmitted light to reach the recording medium via the nano-aperture, the optical path of the light transmitted from the waveguide 152 must be changed toward the nano-aperture 154 in the waveguide 152. To realize this, an optical path conversion unit is disposed between the waveguide 152 and the nano-aperture 154.

Figure 4:
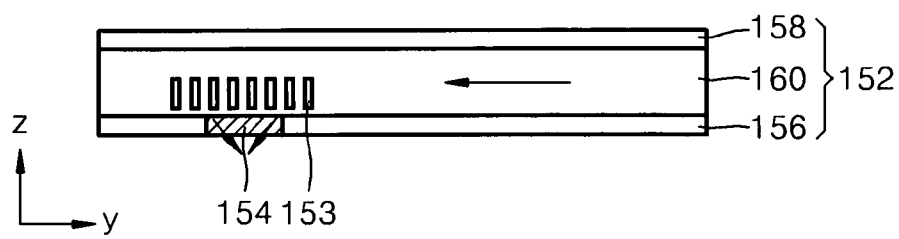
FIG. 4 is a view of an example of an optical path conversion unit used in the HAMR head of FIG. 2, according to an embodiment of the present invention.

FIG. 4 is a view of the waveguide 152 and the optical conversion unit that are depicted in FIGS. 2 and 3. Referring to FIG. 4, the waveguide 152 has a focusing surface facing the nano-aperture 154. A grating pattern 153 for focusing the light traveling along the waveguide 152 on the nano-aperture 152 is formed on the focusing surface of the waveguide 152. That is, the light traveling along the waveguide 152 is diffracted to be focused on the nano-aperture 154. In order to enhance this effect, the spacing of the grating pattern 153 may be reduced toward a central portion.

Figure 5:
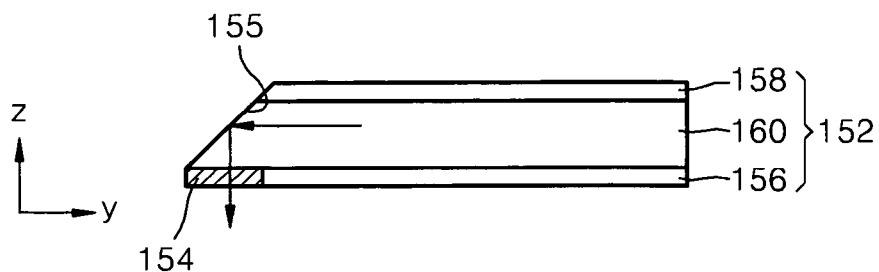
FIG. 5 is a view of a modified example of the optical path conversion unit of FIG. 4, according to another embodiment of the present invention.

FIG. 5 is a view of a modified example of the optical path conversion unit of FIG. 4, according to another embodiment of the present invention. Referring to FIG. 5, a mirror 155 is located on the end portion of the waveguide 152 to allow the light traveling along the waveguide 152 to be directed toward the nano-aperture 154. The light transmitted from the waveguide 152 is reflected from the mirror 155 toward the nano-aperture 154. The reflection surface of the mirror 155 may have a parabolic-surface shape to convert the optical path of the light and focus the light on the nano-aperture.

Referring again to FIGS. 4 and 5, the waveguide 152 includes a first clad layer 156, a second clad layer 158, and a core layer 160 between the first and second clad layers 156 and 158. Since the waveguide 152 transmits the light using total reflection, the first and second clad layers 156 and 158 must be formed of a material having a refractive index greater than that of the material of the core portion 160.

The waveguide 152 may be formed as a step index type where the refractive index is uniform in the core layer 160 and varies abruptly at the boundary between the core layer 160 and first and/or second clad layers 156 and 158.

Alternatively, the waveguide 152 may be formed in a graded index type in which the refractive index is maximum at the central part of the core layer 160 and is gradually reduced as it approaches the first and second clad layers 156 and 158 so as to be identical to those of the first and second clad layers.

Figure 6A:
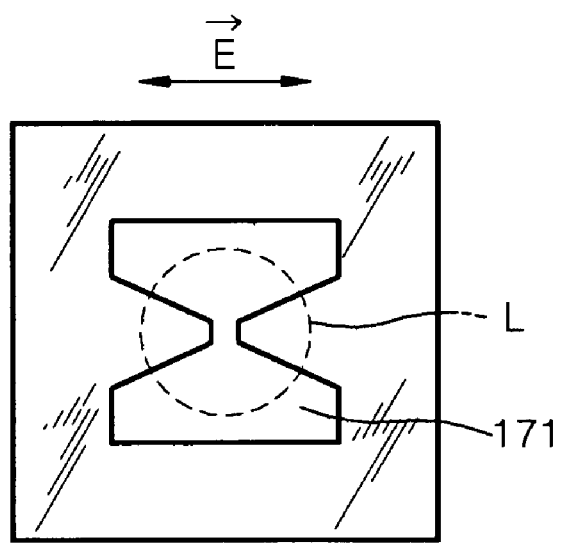
FIGS. 6a through 6c are views of examples of nano-apertures used in the HAMR head of FIG. 2, according to an embodiment of the present invention.
Figure 6B:
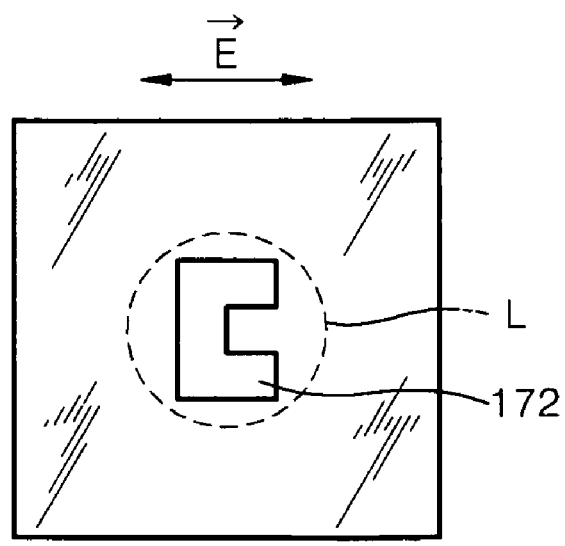
Figure 6C:
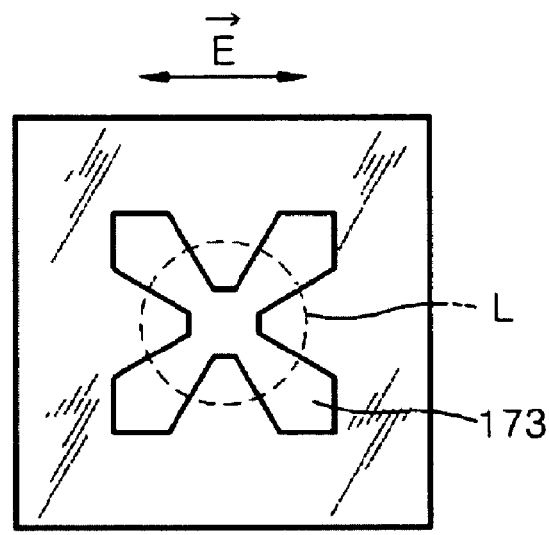

FIGS. 6a through 6c are views of examples of nano-apertures that may be used in the HAMR head of FIG. 2. The examples are shown in a section of the ABS. That is, FIG. 6a shows a bow-tie type nano-aperture 171, FIG. 6b shows a C-type nano-aperture 172, and FIG. 6c shows an X-type nano-aperture 173. In the drawings, reference letter L indicates the diameter of the light incident on the nano-apertures 171, 172, and 173. In each of the nano-apertures 171, 172 and 173, the electric field E is enhanced at the center portion having a relatively narrow width by the vibration of an electric dipole, thereby concentrating the wide optical energy on a local portion. Therefore, the light having the optical energy that is locally enhanced can be transmitted.

Figure 7:
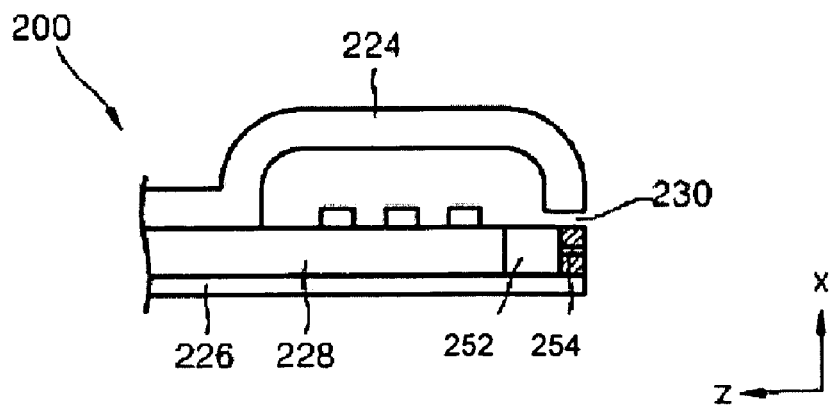
FIG. 7 is a partial view of a HAMR head according to another embodiment of the present invention.

FIG. 7 is a partial side view of a HAMR head 200 according to another embodiment of the present invention. Comparing the HAMR 200 with the HAMR 100, the locations of a main pole 226 and a sub-yoke 228 are switched with each other.

A waveguide 252 and a nano-aperture 254 are arranged in a space defined between the main pole 226 and the sub-yoke 228 spaced apart from the ABS. An optical path conversion unit for allowing the optical path to be converted toward the nano-aperture 254 is disposed between the waveguide 252 and the nano-aperture 254. The optical path conversion unit may be in the form of the grating pattern depicted in FIG. 4 or the mirror depicted in FIG. 5, for example.

Figure 8:
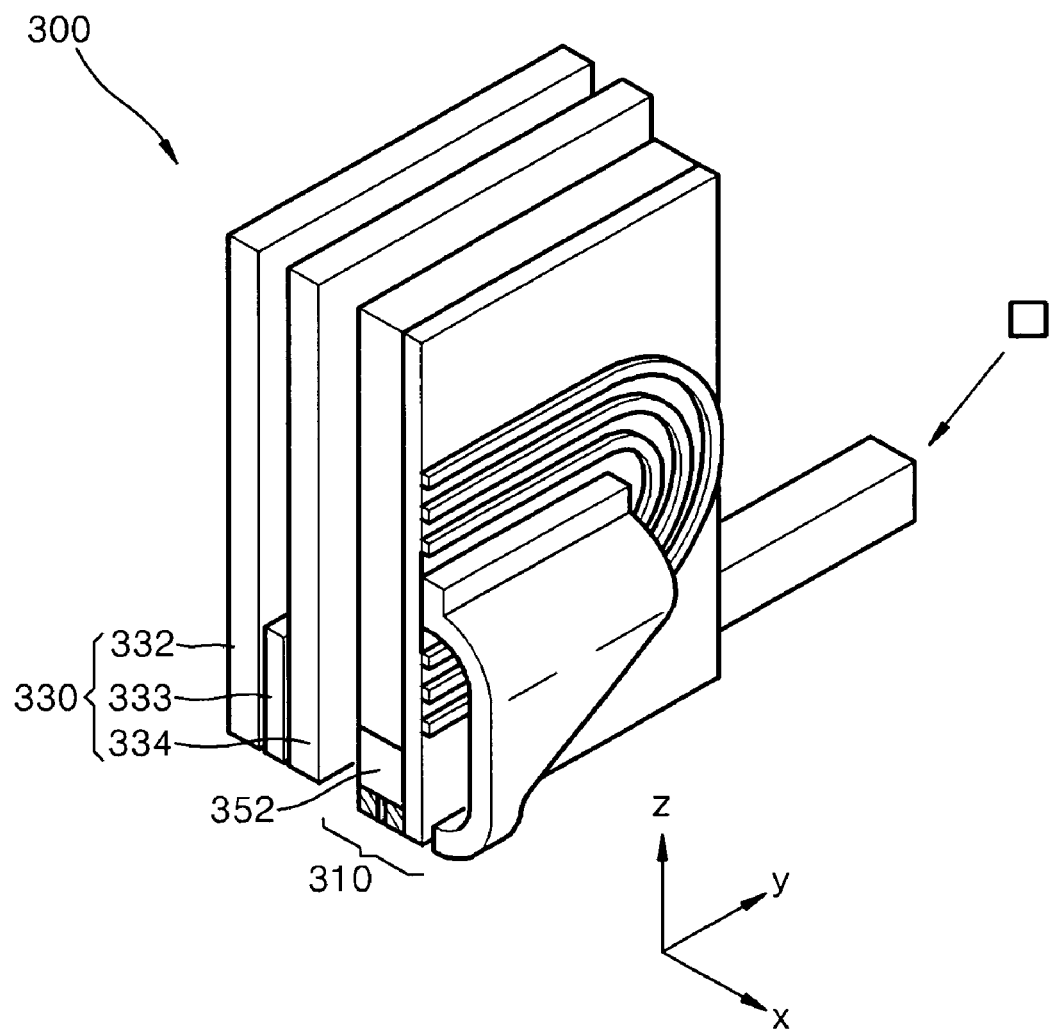
FIG. 8 is a perspective view of a HAMR head according to another embodiment of the present invention.

FIG. 8 is a perspective view of a HAMR head 300 according to another embodiment of the present invention. Referring to FIG. 8, the HAMR head 300 includes a recording head unit 310 and a reproduction head unit 330. The reproduction head unit 330 includes a first shield layer 332, a second shield layer 334 and a reproduction sensor 333 disposed between the first and second shield layers 332 and 334. The surfaces of the first shield layer 332, the second shield layer 334, and the reproduction sensor 333 opposite to the recording medium are located on the plane of the ABS.

Since the rest of the structure of the recording head unit 310 is similar to those of the HAMR heads 100 and 200, a detailed description thereof will be omitted herein.

The waveguide 352 may be formed of polymer. In this case, the waveguide 352 may be fabricated through a low temperature process of about less than 150° C. below which the magnetic property of the reproduction sensor 33 is not affected. Therefore, the HAMR head 300 can be formed in a monolithic body with the waveguide 352 in a batch process for manufacturing a conventional magnetic head.

The HAMR head according to the present invention has the following advantages, among other advantages.

First, since the space between the sub-yoke and the main pole is used as the waveguide, the structure thereof is more compact.

Second, when the waveguide is formed of polymer, the lower temperature process does not affect the reproduction sensor. Therefore, the HAMR head can be formed monolithically through a batch process used for manufacturing the conventional magnetic head.

Third, since the distance between the magnetic field generation unit for recording data and the optical energy emission unit for heating the recording medium is minimized, there is no possibility that the recording will be performed after the heated recording medium is cooled, thereby improving the stability of the recording.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A heat-assisted magnetic recording head mounted on an end of a slider having an Air Bearing Surface for recording data on a recording medium, the heat-assisted magnetic recording head comprising:
   a magnetic path forming unit that generates a magnetic field for recording the data;
   a light source that emits light to heat a local region of the recording medium;
   a waveguide located on a side of the magnetic path forming unit, the waveguide transmits the light emitted from the light source;
   an optical path conversion unit that changes a direction of the light transmitted from the waveguide to the local region of the recording medium; and
   a nano-aperture configured to generate an enhanced near-field effect by converting an energy distribution of the light transmitted via the optical path conversion unit.

2. The heat-assisted magnetic recording head of claim 1, wherein the optical path conversion unit is a mirror formed on an end of the waveguide and inclined so as to direct light traveling along the waveguide towards the nano-aperture.

3. The heat-assisted magnetic recording head of claim 1, wherein the optical path conversion unit is a grating pattern formed on a surface of the waveguide so as to direct light traveling along the waveguide towards the nano-aperture.

4. The heat-assisted magnetic recording head of claim 3, wherein spacing of the grating pattern is reduced toward a central portion of the grating pattern.

5. The heat-assisted magnetic recording head of claim 1, wherein the magnetic path forming unit comprises:
   a coil that provides a magnetic field source;
   a main pole comprising a first end portion that faces the recording medium and is located on a plane of the air bearing surface;
   a sub-yoke disposed on a side surface of the main pole and comprising a second end portion that faces the recording medium, wherein the first and second end portions are stepped to focus the electric field on the first end portion; and
   a return yoke forming the magnetic path of the magnetic field together with the main pole and comprising a one end of the return yoke spaced apart from the main pole and another end of the return yoke connected to the main pole.

6. The heat-assisted magnetic recording head of claim 5, wherein at least a part of the waveguide, the optical path conversion unit, and the nano-aperture are arranged in a space between the first and second end portions.

7. The heat-assisted magnetic recording head of claim 5, wherein a saturation magnetization value of the main pole is greater than that of the sub-yoke.

8. The heat-assisted magnetic recording head of claim 1, wherein the waveguide comprises:
   a first clad layer;
   a second clad layer; and
   a core layer disposed between the first and second clad layers and having a refractive index greater than a refractive index of the first clad layer and greater than a refractive index of the second clad layer.

9. The heat-assisted magnetic recording head of claim 8, wherein the waveguide is a graded index type waveguide having a refractive index that is maximum at a central portion and is gradually reduced toward the first and second clad layers.

10. The heat-assisted magnetic recording head of claim 1, further comprising:
    a first shield;
    a second shield spaced apart from the first shield; and
    a reproduction member disposed between the first and second shields,
    wherein surfaces of the first shield, the second shield, and the reproduction member opposite to the recording medium are located on a plane of the air bearing surface.

11. The heat-assisted magnetic recording head of claim 10, wherein the waveguide is formed of polymer.

12. The heat-assisted magnetic recording head of claim 1, wherein the light source is butt-coupled to the waveguide.

13. The heat-assisted magnetic recording head of claim 1, further comprising a prism coupler that couples the light source to the waveguide.

14. A heat-assisted magnetic recording head mounted on an end of a slider having an Air Bearing Surface for recording data on a recording medium, the heat-assisted magnetic recording head comprising:
- a magnetic path forming unit that generates a magnetic field for recording the data;
- a light source that emits light to heat a local region of the recording medium;
- a waveguide located on a side of the magnetic path forming unit, the waveguide transmits the light emitted from the light source; and
- means for generating an enhanced near-field effect by converting an energy distribution of the light source.

15. A heat-assisted magnetic recording head for mounting on an end of a slider having an Air Bearing Surface for recording data on a recording medium, the heat-assisted magnetic recording head comprising:
- a magnetic path forming unit that generates a magnetic field for recording the data and comprising a main pole and a sub-yoke;
- a light source that emits light to heat a local region of the recording medium;
- a waveguide that transmits the light emitted from the light source; and
- a nano-aperture optically coupled to the waveguide; and
- wherein the waveguide is located in a space between the sub-yoke and the main pole.

* * * * *